(12) United States Patent
McKechnie (10) Patent No.: US 8,576,408 B2
(45) Date of Patent: Nov. 5, 2013

(54) SURFACE FIGURE TEST METHOD FOR LARGE CONVEX OPTICAL SURFACES

(76) Inventor: Thomas Stewart McKechnie, Albuquerque, NM (US)

( * ) Notice: Subject to any disclaimer, the term of this patent is extended or adjusted under 35 U.S.C. 154(b) by 204 days.

(21) Appl. No.: 13/084,365

(22) Filed: Apr. 11, 2011

(65) Prior Publication Data

US 2012/0259447 A1 Oct. 11, 2012

(51) Int. Cl.
*G01B 11/02* (2006.01)

(52) U.S. Cl.
USPC .......................................... 356/515; 356/513

(58) Field of Classification Search
USPC ................................................. 356/513–515
See application file for complete search history.

(56) References Cited

U.S. PATENT DOCUMENTS

| 8,089,633 B2 * | 1/2012 | McKechnie | 356/513 |
| 2005/0134864 A1 * | 6/2005 | Deck | 356/514 |
| 2005/0225774 A1 * | 10/2005 | Freimann et al. | 356/515 |

* cited by examiner

*Primary Examiner* — Tarifur Chowdhury
*Assistant Examiner* — Jonathan Hansen
(74) *Attorney, Agent, or Firm* — Kenneth E. Callahan (57) ABSTRACT

A method of testing figure quality of a convex mirror in which an optical quality substrate material is used. Three separate interferometric null tests are carried out to produce three independent sets of optical path difference (OPD) data. Null lenses, or nulling computer generated holograms (CGHs), are designed and used as needed in each test setup so that spherical aberration is corrected. From the three sets of OPD data, surface figure errors on the rear and front surfaces of the test optic are calculated as well as the OPD error introduced by refractive index inhomogeneity in the substrate material. The rear surface is then corrected, generally using a computer-controlled polishing machine, to reduce rear surface errors to a manageably small level. The front convex surface of the test optic is then corrected to reduce surface figure error to within some specified amount.

4 Claims, 9 Drawing Sheets

Interferometric test setup #1
Testing the concave rear surface ($S_1$) of a large convex secondary aspheric mirror FIG. 1
Hindle Sphere Test
(Prior Art)

FIG. 2
Hindle-Simpson Test
(Prior Art)

FIG. 3
Hindle-Simpson Test with a Shortening Lens

FIG. 4
Coordinate grid system (x,y) located in the pupil plane of the test optic FIG. 5
Interferometric test setup #1
Testing the concave rear surface ($S_1$) of a large convex secondary aspheric mirror

FIG. 6
Interferometric Null Test #2
The test beam transmits through the concave rear surface and reflects off the convex mirror surface of interest. A small null lens is used to null spherical aberration.

FIG. 7
Interferometric Null Test #3
The test beam transmits through the convex mirror front surface and reflects off the concave rear surface – test optic reversed.

FIG. 8
Interferometric Null Test #4
Test optic is tested as though it were a lens

FIG. 9
Typical Residual Null Test Accuracy

SURFACE FIGURE TEST METHOD FOR LARGE CONVEX OPTICAL SURFACES

BACKGROUND OF THE INVENTION

The invention relates generally to an interferometric method for testing large convex (spherical or aspheric) mirror surfaces. These convex mirrors are typically used as the secondary mirrors of Cassegrain and related telescope types such as Ritchey-Chretien. The invention is a further improvement on the methods described in U.S. patent application Ser. No. 12/343,683 filed Dec. 24, 2008 and Ser. No. 12/467,278 filed May 17, 2009, wherein the mirror is initially treated as a lens to obtain a precise surface figure for the convex surface prior to applying a reflective coating. These applications are hereby incorporated by reference. While this invention is primarily concerned with testing large (or small) convex mirror surfaces, the same type of test can be applied to testing lenses, in particular lenses with at least one convex surface (spherical or aspheric).

Figure 1:
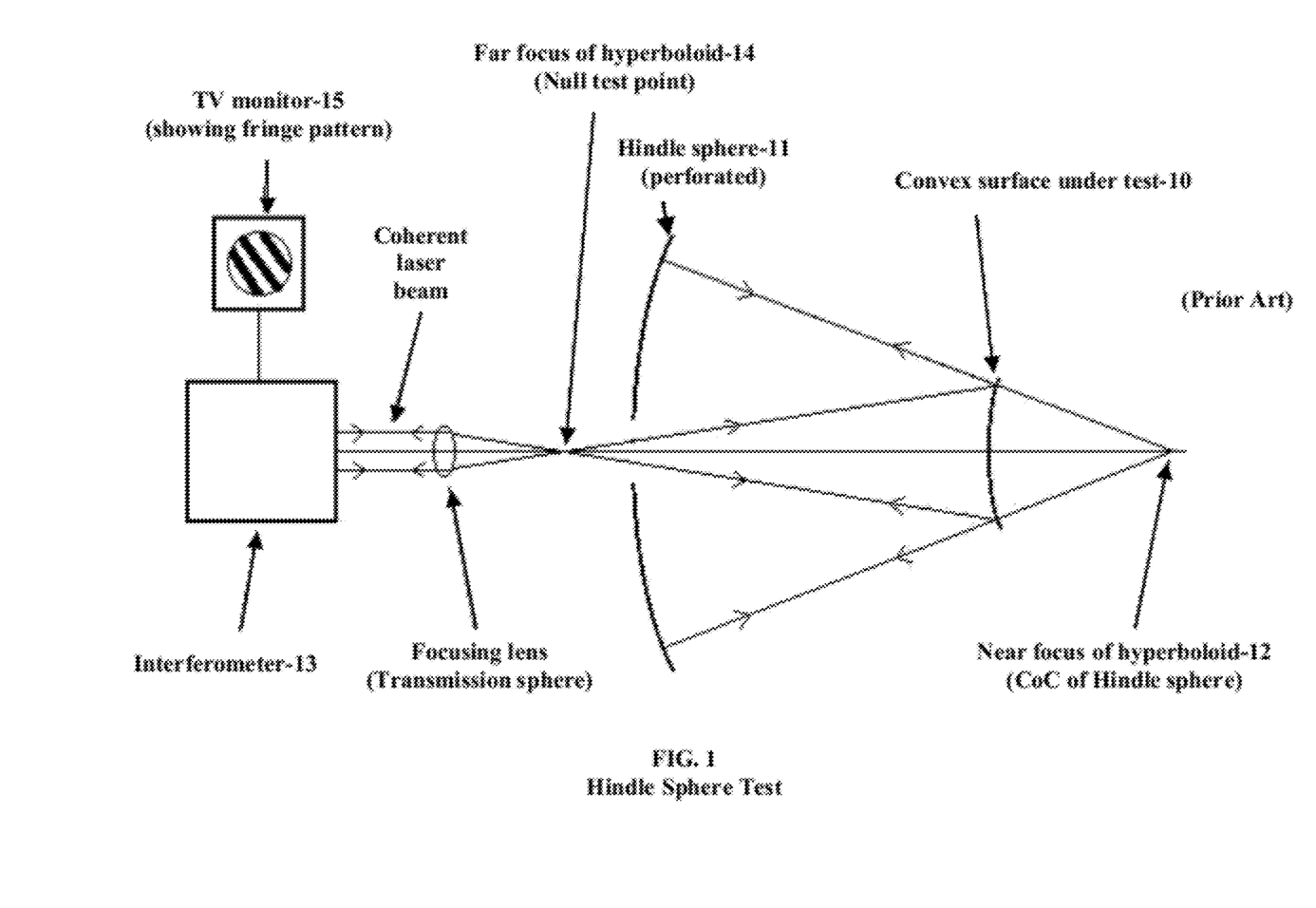
FIG. 1 is a diagram of the test setup for a Hindle sphere test for measuring a convex mirror surface (prior art).

Large convex mirrors are typically used as secondary mirrors in large reflecting telescopes. For example, the NASA 3-meter telescope on Mona Kea uses a 244-mm diameter secondary mirror having a hyperbolic surface figure. Currently the standard method for testing convex mirrors is the Hindle sphere test or the improved version, the Hindle-Simpson test. The Hindle test uses a spherical mirror that is significantly larger in diameter than the convex mirror under test and it must be perforated at its center. A diagram of the test set-up is shown in FIG. 1.

The convex mirror under test, the test optic 10, is tested at the same conjugates as used in the telescope by employing a Hindle Sphere 11, a spherical mirror with a central perforation. The center of curvature (CoC) of the Hindle Sphere is positioned at the near focus 12 of the convex surface under test. The diameter of the Hindle Sphere has to be greater than that of the test optic. Light from an interferometer 13 is brought to the null test point 14 at the far focus of the convex surface of the test optic. After reflections off the test optic 10 and the Hindle Sphere 11, the light re-traces its path back to the interferometer 13 where it produces fringes on a monitor 15 depicting the wavefront aberrations of the test optic.

Figure 2:
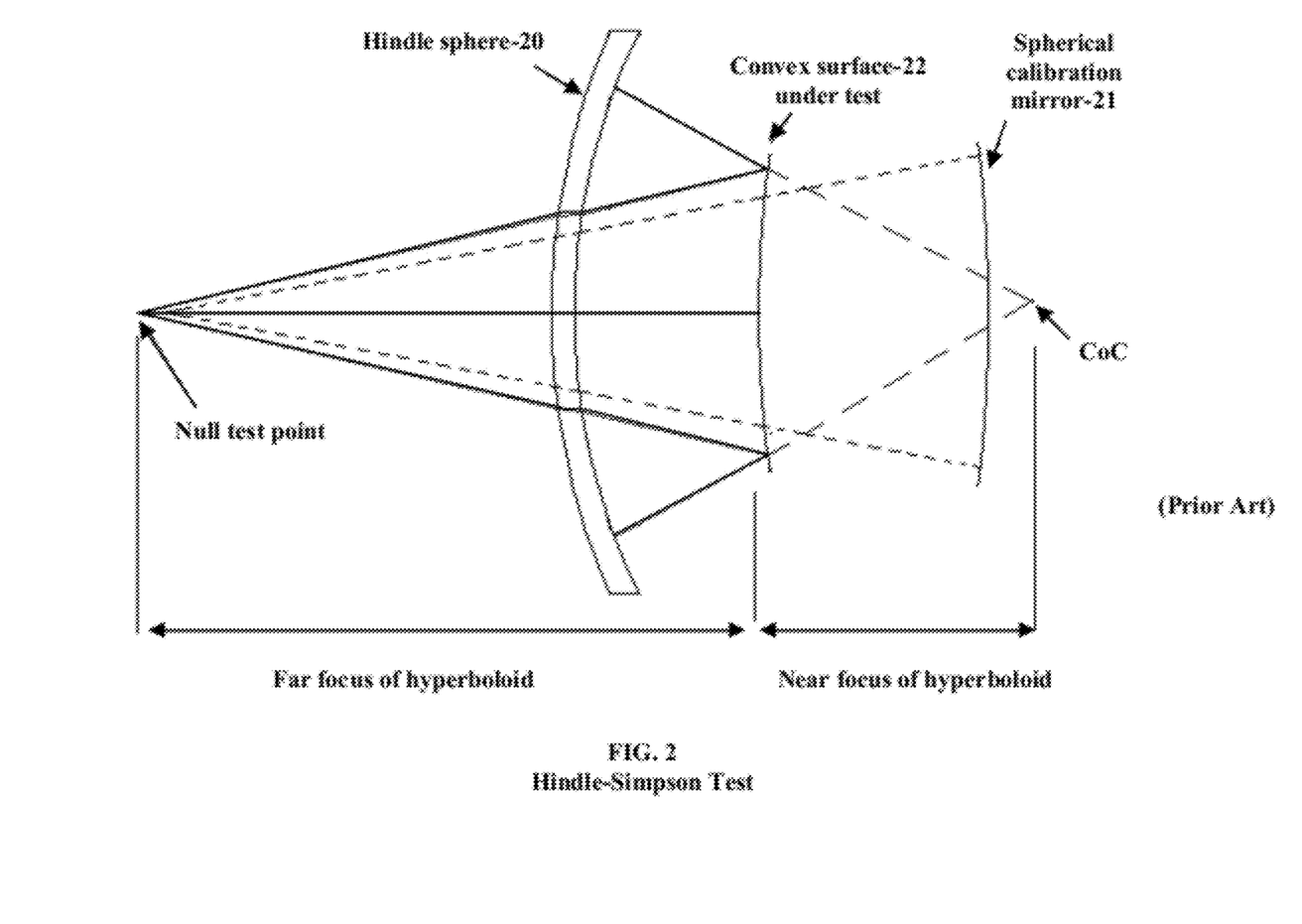
FIG. 2 is a diagram of the standard Hindle-Simpson test setup for measuring surface figure quality of convex aspheric mirrors (prior art).

A schematic of the Hindle-Simpson test set-up is shown in FIG. 2. This test makes use of a meniscus-shaped Hindle Sphere 20 and a concave calibration mirror 21. All surfaces in the arrangement are spherical. By designing the ancillary optics, in this case the meniscus-shaped Hindle Sphere and the concave calibration mirror, to lie close to the convex mirror under test 22, the diameters of these optics are minimized with a corresponding reduction in the cost of fabrication. Nonetheless, the diameters still have to be somewhat larger than the diameter of the test optic.

Figure 3:
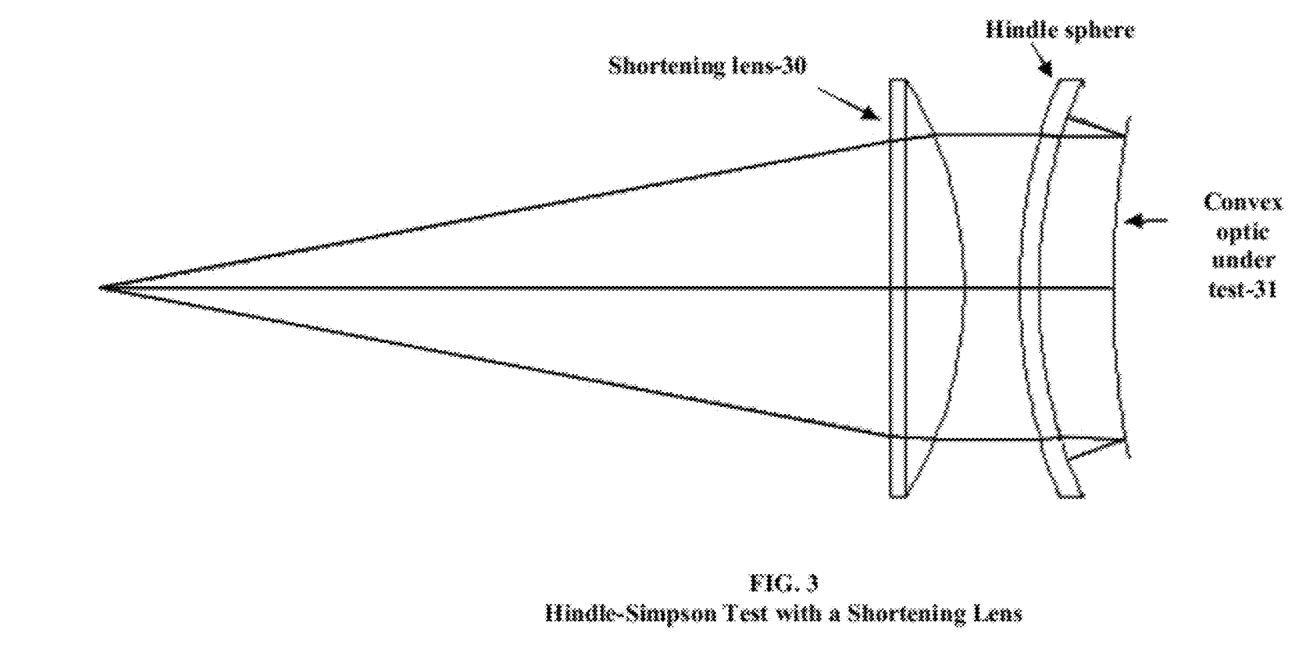
FIG. 3 is a diagram of the Hindle-Simpson test with a shortening lens.

In large telescopes, astronomical or otherwise, the secondary mirror often directs the light to a focus through a central hole in the primary. The distance from the vertex of the secondary mirror to this focus can be many meters, perhaps more than 10 meters. To reduce the total length of the test setup, a shortening lens 30 is often used as shown in FIG. 3. The lens is often a plano-convex lens with spherical convex surface. Again, this lens has to have a diameter greater than the diameter of the mirror under test 31, further adding to the complexity and cost of the test setup.

The Hindle-Simpson test is not easily or cheaply implemented because of the large diameter requirements for the Hindle-Sphere—a meniscus element, and a calibration mirror—a concave spherical mirror. The diameters of both must be larger than the diameter of the test optic. For example, Hindle-Sphere and Calibration Mirror diameters for testing the 1.4-meter diameter convex hyperboloid secondary mirror for the F/15 Keck Telescope Secondary Mirror both have to be at least 1.4 meters. Each optical surface of these large ancillary components must all be precisely figured and polished.

Computer Generated Holograms (CGH) can be used for testing large convex mirror surfaces. Again, the CGH diameter has to be larger than the test optic diameter. Therefore, this approach does not eliminate the requirement for large expensive ancillary optics.

The previously mentioned test methods for the surface figure of large convex mirrors (U.S. patent application Ser. Nos. 12/343,683 and 12/467,278) requires a substrate with good optical homogeneity. The front side is shaped and polished to approximately the desired convex curvature and the rear side must be shaped to a simple but precise surface figure, such as an optical flat. In the present invention, the substrate material need not be of good optical quality nor does the rear side have to be shaped to a precise surface figure. Both of these characteristics will be measured and taken into account when determining corrections to the front surface figure. A further benefit of the test method described here is that ancillary optical component diameters are significantly smaller that the test optic diameter, usually by a factor of about 10×. Assuming substrate weight proportional to test optic diameter raised to the third power, the weight of these ancillary optics is generally about 1000× less than that of equivalent Hindle-Sphere ancillary optics. The size and weight reductions in the ancillary optics afforded by the test method leads to optically precise interferometric tests setups that can be constructed and implemented rapidly at significantly reduced cost.

SUMMARY

A method of testing the surface figure of a convex mirror (spherical or aspheric) is described that allows a significant reduction in the complexity and size of the ancillary test optics, making their fabrication simpler and less expensive. Ancillary optics diameters, whether null lenses or computer generated holograms, are typically 10× smaller than the diameter of the convex mirror under test. The convex mirror, referred to as the test optic, is fabricated from a substrate material that is transmissive at the chosen test wavelength. The rear surface of the test optic is polished and figured to some convenient but not necessarily precise shape, generally concave spherical for ease of testing. The front surface of the substrate is shaped and polished to approximately the desired convex curvature. The test optic can then be tested as though it were a lens. Using this test method any refractive index inhomogeneity of the substrate material will not affect the final figure accuracy of the front convex surface. This is the surface that will ultimately be coated with a reflective material to produce the desired convex mirror.

Generally, three separate interferometric test setups are used in the test method. An optical path difference (OPD) data set is obtained from each of the three setups. Each data set is obtained at the same grid array of points $(x_i, y_j)$ in the pupil of the test optic. Analysis of the three OPD data sets allows, not only extraction of the surface figure errors on both the front and rear surfaces of the test optic, but also the OPD error caused by refractive index inhomogeneities in the substrate material. This information is then used to approximately correct the rear surface figure. Subsequently, the front convex mirror surface can be corrected to any desired surface figure accuracy.

DESCRIPTION OF THE PREFERRED EMBODIMENT

The test method of the present invention can be applied to test extremely large test optics, in particular, large convex mirror surfaces, where the front mirror surface may be spherical or aspheric. In principle, there is no limit to the diameter of test optic that can be tested since the ancillary optics diameters are typically smaller by a factor 10×. In this invention, the mirror substrate of the test optic is treated as though it were a lens. The front surface of this substrate is convex. This is the surface to be iteratively tested and polished to the required curvature and then coated with a reflective material to form the convex mirror. The rear surface of the substrate is polished and figured to a convenient shape, typically a mildly concave surface, to thereby form a lens. The substrate material must be transmissive at the interferometric test wavelength to be used. There are many types of glass, plastic, crystalline, and other materials that may be used for the substrate. Zerodur or fused silica might often be used because they have low thermal expansion coefficients. The material need not have good optical homogeneity since wavefront aberrations introduced by the material will be measured and compensated for using the test method.

In one embodiment, the test method requires three separate interferograms obtained from three different interferometric setups. From the three sets of interferometric data thus obtained, the surface figure error can be calculated for both front and rear surfaces of the test optic as well as the optical path difference (OPD) error caused by refractive index inhomogeneity within the test optic substrate. In cases where there is zero or negligible inhomogeneity in the substrate, surface figure errors for the two surfaces can be calculated from a two-interferogram subset of the general (three-interferogram) case.

The three interferometric test arrangements are chosen to provide a well-conditioned set of three simultaneous equations, from which the front and rear surface figure errors and OPD error introduced by refractive index inhomogeneity can be calculated separately.

Figure 4:
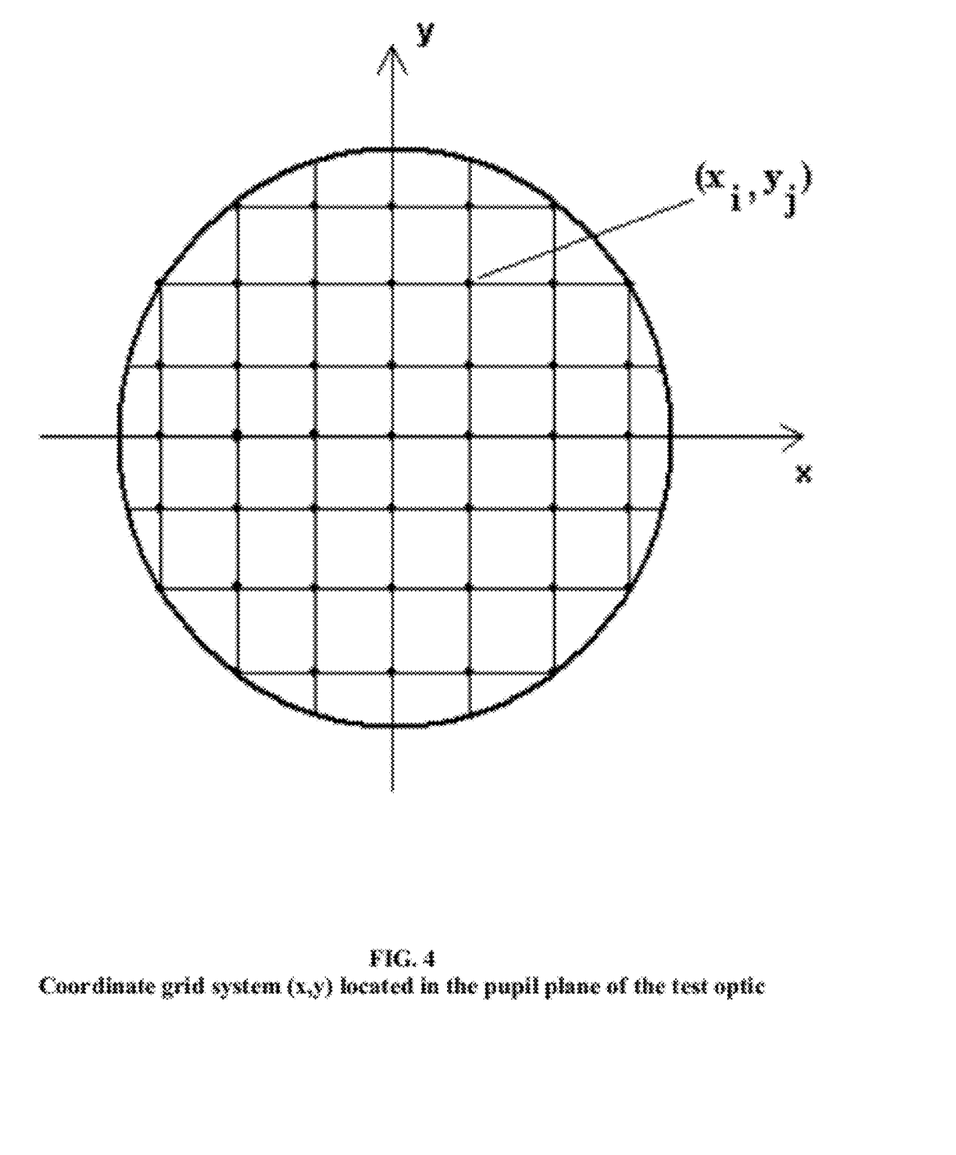
FIG. 4 shows the coordinate system (x,y) located in the pupil plane of the test optic.

Each interferogram allows measurement of the OPD variations at the same grid of points, $(x_i,y_j)$, over the pupil of the test optic, as shown in FIG. 4, where $i=1 \ldots N$, $j=1 \ldots M$, and where N and M are large numbers, typically in the range one hundred to one thousand.

By analyzing the interferometric data from all three interferograms, surface figure errors can be ascertained over the entire $(x_i,y_j)$ point array for both front and rear surfaces of the test optic as well as OPD error introduced by substrate refractive index inhomogeneity. Surface figure error information can then be transferred to a computer-controlled polishing machine, which would then correct the error on both front and rear surfaces.

While the rear surface would not have to be figured to high precision, the front surface, the surface of interest, would need to be precisely figured. Typically, several testing and figuring cycles are needed before the residual surface figure error falls within the required surface figure specification for the front convex surface. Reflective material may then be deposited on this surface to obtain the desired convex mirror. General Approach where Front and Rear Surface Figure Errors have to be Characterized as Well as the Refractive Index Inhomogeneity in the Substrate Material.

The general approach requires use of three independent interferometric setups. Four possible interferometric setups are shown in FIGS. 5-8. From these, one would choose the three most convenient. For purposes of illustration, two cases are described: Case 1 uses the test setups shown in FIGS. 5, 6, and 7 corresponding to interferometric test setups 1, 2, and 3; Case 2 uses the test setups shown in FIGS. 5, 6, and 8 corresponding to interferometric test setups 1, 2, and 4. The equation solutions for both cases are given below for obtaining the desired parameters, $h_1(x_i,y_j)$, $h_2(x_i,y_j)$, and $OPDI(x_i,y_j)$ from the OPD data generated by the three tests.

Case 1: Using Test Setups #1, #2, and #3

Figure 5:
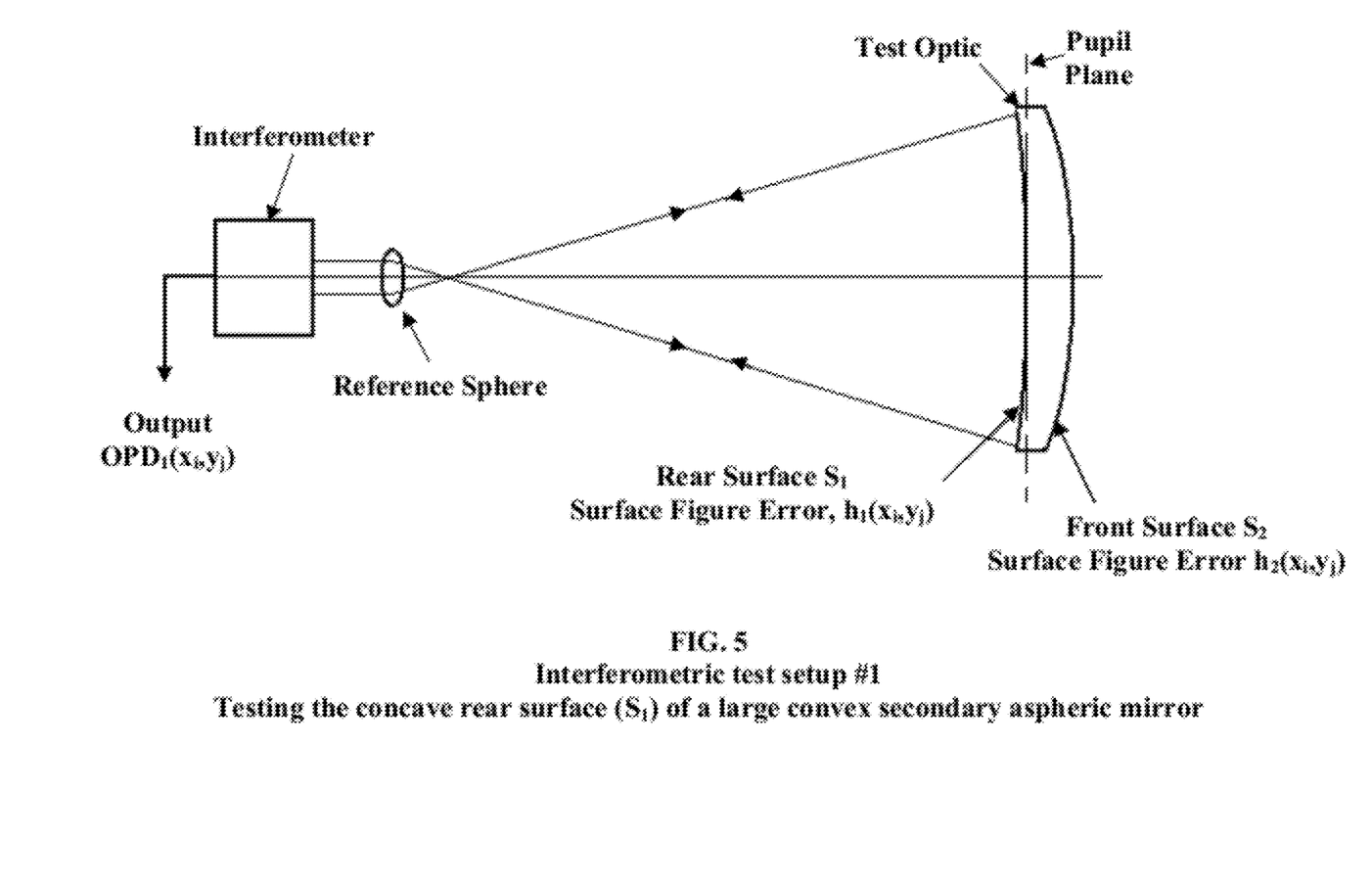
FIG. 5 is a diagram of interferometric test setup #1 testing the concave rear surface of the test optic.
Figure 6:
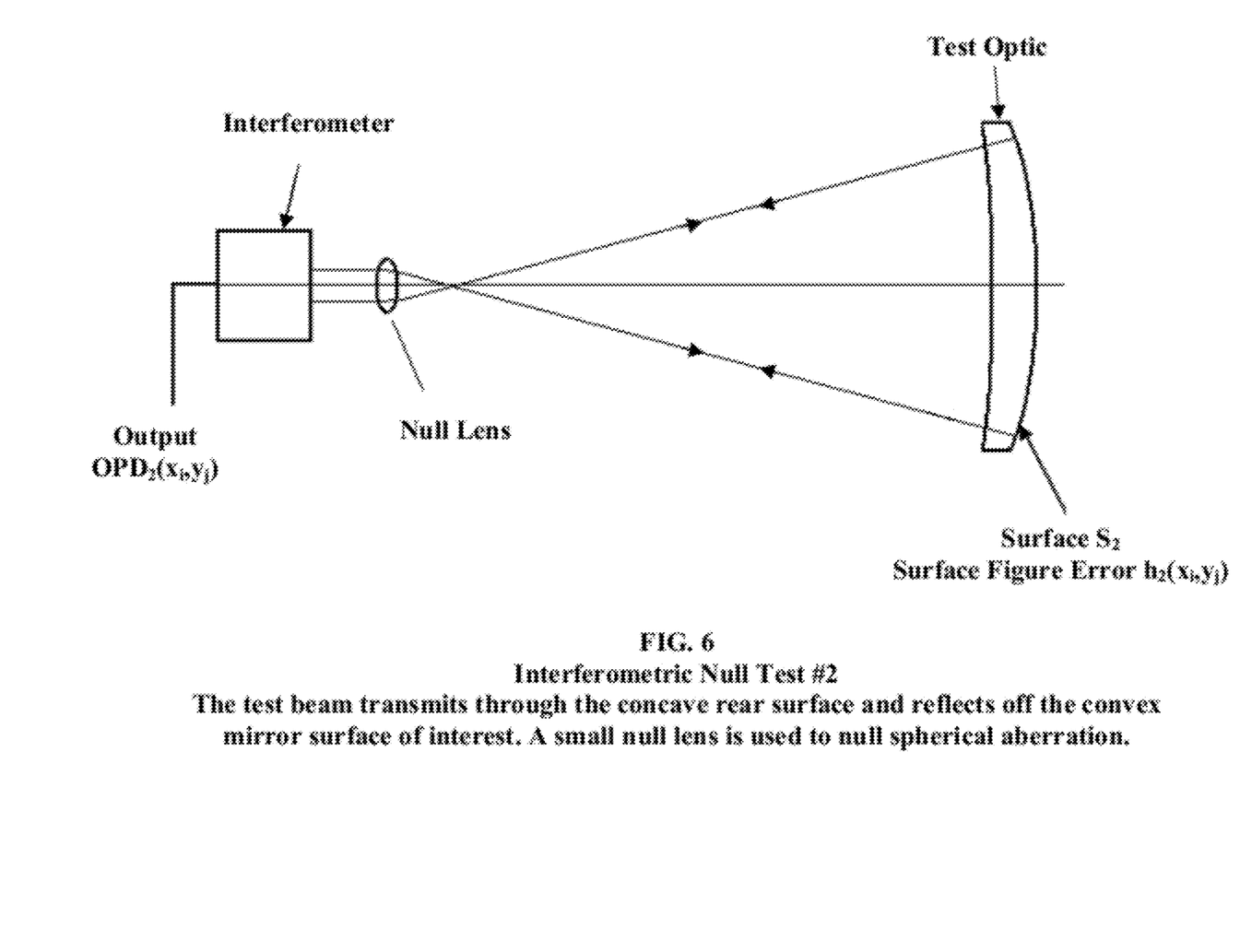
FIG. 6 is a diagram of interferometric null test setup #2 in which the test beam transmits through the concave rear surface and reflects off the convex front surface.
Figure 7:
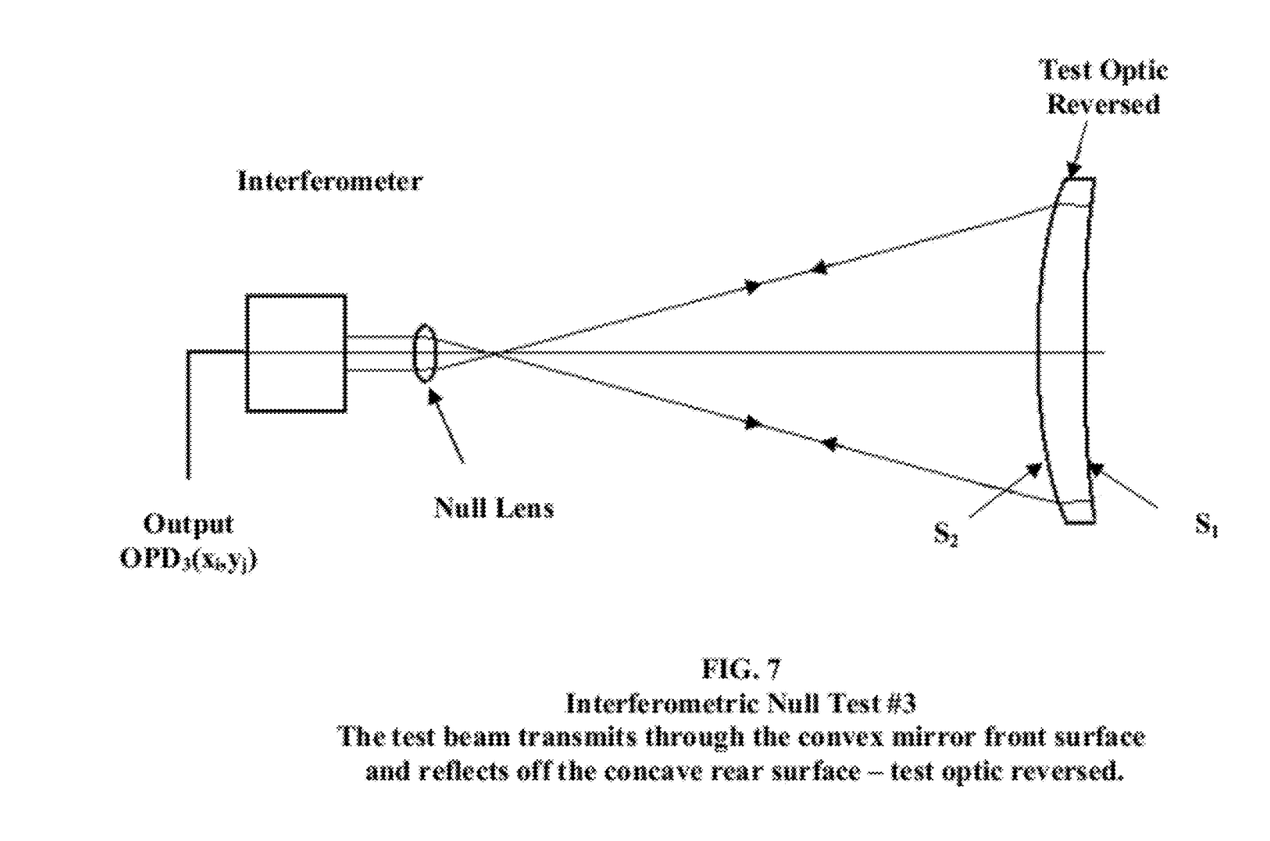
FIG. 7 is a diagram of interferometric null test setup #3 in which the test beam transmits through the convex mirror front surface and reflects off the concave rear surface.
Figure 9:
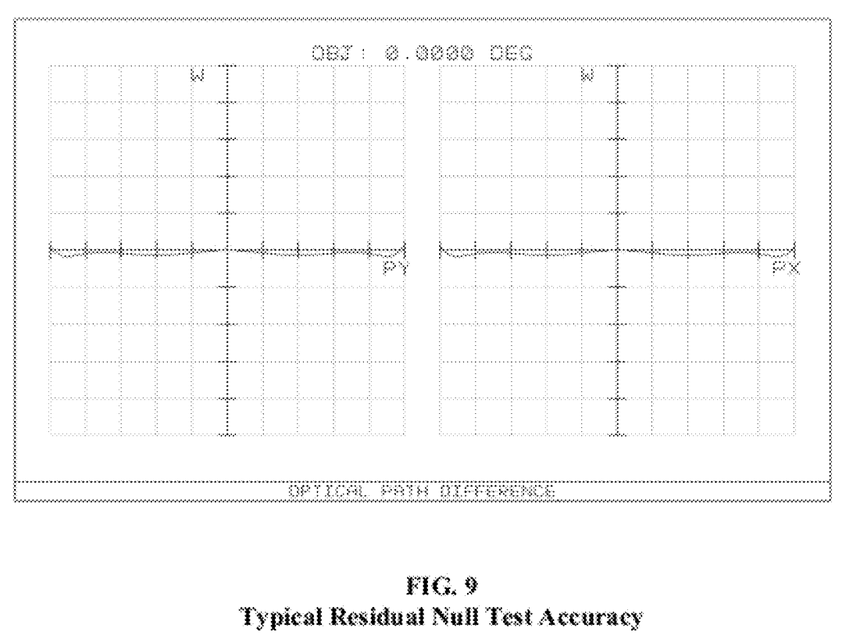
FIG. 9 is a plot showing typical residual null test accuracy.

The test setup in FIG. 5 is inherently a null test if the rear surface $S_1$ has a concave spherical shape. Thus, no null lens is needed for this particular test setup. Null lenses are shown in the other two test setups used in this example (FIGS. 6 and 7). Instead of using null lenses, one can also envisage use of Computer Generated Holograms (CGH) to null the aberrations. The diameters of the CGHs would need to be no larger than the null lens diameters; often their diameters would be smaller. FIG. 9 shows typical residual null test accuracy when simple null lenses are used with spherical or planar surfaces. Residual null test error could be entirely removed by use of multi-element null lenses (or mirrors), or aspheric null lenses, or by use of null CGHs.

The interferometric test setup #1 shown in FIG. 5 is used to test the concave rear surface $S_1$ of a large convex secondary aspheric mirror, the test optic, for this example. The front surface $S_2$ of the test optic faces away from the interferometer. A coherent collimated beam passes through the reference sphere, which initially converges then diverges the beam. The test optic is located at the point where the diverging beam fills its aperture. A fraction of the beam is reflected back through the reference sphere from the $S_1$ surface and into the interferometer generating the optical path difference array $OPD_1(x_i, y_j)$ from which the surface figure error array $h_1(x_i,y_j)$ is obtained for the rear surface $S_1$.

Interferometric null test #2 is shown in FIG. 6 where it is used to obtain the surface figure error of the convex surface $S_2$. The coherent test beam passes through the null lens and through the concave rear surface where a fraction of the beam is reflected off the convex surface of the test optic and back into the interferometer, generating the $OPD_2(x_i,y_j)$ output from which the surface figure error array $h_2(x_i,y_j)$ is obtained for the rear surface $S_2$. This surface figure error, of course, includes errors introduced by $S_i$ and any inhomogeneity of the substrate material.

Interferometric null test #3 provides the data set $OPD3(x_i, y_j)$. This setup, shown in FIG. 7, is similar to test #2 except that the test optic is reversed, i.e., the convex surface is facing the interferometer. The test beam passes through the convex front surface $S_2$ and reflects off the concave rear surface $S_1$.

Three sets of Optical Path Differences arrays, denoted by $OPD_1(x_i,y_j)$, $OPD_2(x_i,y_j)$, and $OPD_3(x_i,y_j)$, are obtained, one from each of the three chosen test setups, for this example, those shown in FIGS. 5, 6 and 7. The (x,y) coordinate system always refers to the same pupil plane in the test optic (FIG. 4). The same set of point locations in this pupil plane $(x_i,y_j)$ are chosen for collecting OPD data from each of the three test setups. A suitable pupil plane location is illustrated in FIG. 5 where the plane contains the vertex of the rear surface $S_1$ of the test optic. In all test setups shown in FIGS. 5-8, the test beam passes through this plane. However, other pupil plane locations can be envisaged that are equally valid.

Mathematical Analysis for Case 1:

Surface figure error on the rear surface $S_1$ of the test optic is denoted by $h_1(x_i,y_j)$. Surface figure error on the convex front surface $S_2$ is denoted by $h_2(x_i,y_j)$. The optical path difference introduced by inhomogeneity in a single-pass through the test optic substrate is denoted by $OPDI(x_i,y_j)$. The following three equations describe how the three OPD data sets, $OPD_1(x_i,y_j)$, $OPD_3(x_i,y_j)$, and $OPD_3(x_i,y_j)$, obtained respectively from the test setups shown in FIGS. 5-7, relate to $h_1(x_i,y_j)$, $h_2(x_i,y_j)$ and $OPDI(x_i,y_j)$:

$$OPD_1(x_i,y_j) = 2 \cdot h_1(x_i,y_j), \quad (1)$$

$$OPD_2(x_i,y_j) = 2 \cdot (n-1) \cdot h_1(x_i,y_j) - 2 \cdot n \cdot h_2(x_i,y_j) + 2 \cdot OPDI(x_i,y_j), \quad (2)$$

$$OPD_3(x_i,y_j) = -2 \cdot (n-1) \cdot h_2(x_i,y_j) + 2 \cdot n \cdot h_1(x_i,y_j) + 2 \cdot OPDI(x_i,y_j). \quad (3)$$

Refractive index values n>1.3 give rise to well-conditioned coefficients in these three simultaneous equations, a range that includes almost all conceivable types of optical substrates. Commonly used optical substrates such as fused silica, BK7, Zerodur, and ClearCeram-Z have refractive index ~1.5, allowing robust solutions to the equations as follows:

$$h_1(x_i, y_i) = \frac{OPD_1(x_i, y_j)}{2}, \quad (4)$$

$$h_2(x_i, y_j) = \frac{OPD_3(x_i, y_j) - OPD_2(x_i, y_j) - OPD_1(x_i, y_j)}{2}, \quad (5)$$

$$OPDI(x_i, y_j) = \frac{(1-2 \cdot n) \cdot OPD_1(x_i, y_j) + (1-n) \cdot OPD_2(x_i, y_j) + n \cdot OPD_3(x_i, y_j)}{2}. \quad (6)$$

Data obtained from Equation 4 for $h_1(x_i,y_j)$ can be used to improve figure accuracy for the rear surface of the test optic. Similarly, data obtained from Equation 5 for $h_2(x_i,y_j)$ can be used to improve the figure accuracy of the front surface of the test optic. Equation 6 provides data characterizing substrate refractive index inhomogeneity.

While rear surface figure error $[h_1(x_i,y_j)]$ does not need to be accuracy corrected, perhaps to ~1-λ (HeNe), figure error on the front surface $h_2(x_i,y_j)$—the surface in which we are primarily interested—would generally have to be corrected to a higher level of accuracy, typically to λ/10 (HeNe).

Surface figure error data, $h_1(x_i,y_j)$ and $h_2(x_i,y_j)$, obtained from Equations 4 and 5 would generally be supplied to a computer-controlled polishing machine to make surface figure corrections. Manual figuring could also be envisaged to execute this task. Several measurement/polishing iterations are generally needed to reduce $h_1(x_i,y_j)$ and $h_2(x_i,y_j)$ to satisfactorily small values.

Figure 8:
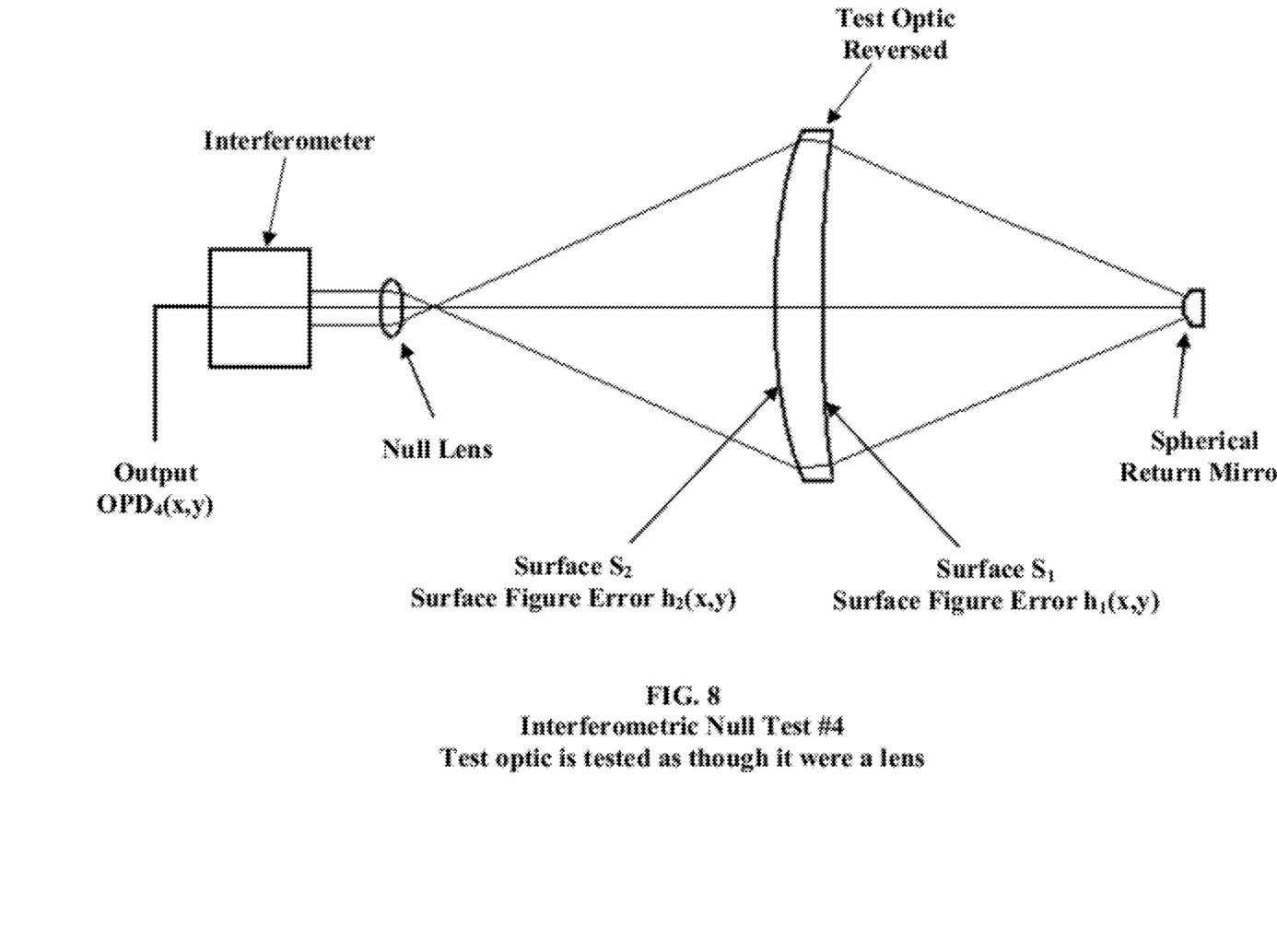
FIG. 8 is a diagram of interferometric null test #4. Test optic is tested as though it were a lens.

Case 2: Using Test Setups #1, #2, and #4 (FIG. 8).

Test setups #1 and #2 are discussed above. In interferometric null test #4 in FIG. 8 the front surface $S_2$ of the test optic is facing the interferometer. A coherent beam from the interferometer passes through the null lens, fills the test optic aperture, passes through the test optic, is reflected back through the test optic by the spherical return mirror, and back into the interferometer generating the optical path difference array $OPD_4(x_i,y_j)$. This OPD array includes errors introduced by $S_1$ and $S_2$ and any inhomogeneity in the substrate material.

Mathematical Analysis for Case 2:

$OPD_4(x_i,y_j)$ is given by the following equation:

$$OPD_4(x_i,y_j) = -2 \cdot (n-1) \cdot h_2(x_i,y_j) + 2 \cdot (n-1) \cdot h_1(x_i,y_j) + 2 \cdot OPDI(x_i,y_j). \quad (7)$$

When interferometric tests #1, #2, and #4 are used as the three independent tests, Equations 1, 2, and 7 have the following solutions for $h_1(x_i, y_j)$, $h_2(x_i,y_j)$ and $OPDI(x_i,y_j)$:

$$h_1(x_i, y_j) = \frac{OPD_1(x_i, y_j)}{2}, \quad (8)$$

$$h_2(x_i, y_j) = \frac{OPD_4(x_i, y_j) - OPD_2(x_i, y_j)}{2}, \quad (9)$$

$$OPDI(x_i, y_i) = \frac{n \cdot OPD_4(x_i, y_j) - (OPD_1(x_i, y_j) + OPD_2(x_i, y_j)) \cdot (n-1)}{2}. \quad (10)$$

Approach in the Degenerate Case (Case 3) where Only the Front and Rear Surface Figure Errors, $h_2(x_i,y_j)$ and $h_1(x_i,y_j)$, have to be Characterized, the Refractive Index Inhomogeneity Effects being Considered Negligible.

Case 3: Using Test Setups #1 and #2 only where $OPDI(x_i,y_j)$ is Assumed to be Zero)

Mathematical Analysis for Case 3

For this degenerate case, $OPDI(x_i,y_j)=0$, Equations 1 and 2 (and Equations 8 and 9) have the following solutions for $h_1(x_i,y_j)$ and $h_2(x_i,y_j)$:

$$h_1(x_i, y_j) = \frac{OPD_1(x_i, y_j)}{2} \quad (11)$$

$$h_2(x_i, y_j) = \frac{(n-1) \cdot OPD_1(x_i, y_j) - OPD_2(x_i, y_j)}{2 \cdot n} \quad (12)$$

As previously, data obtained from Equation 11 for $h_1(x_i,y_j)$ can be used to improve the surface figure accuracy of the rear surface of the test optic. Similarly, data obtained from Equation 12 for $h_2(x_i,y_j)$ can be used to improve the surface figure accuracy of the front surface of the test optic.

Again, while it might only be necessary to correct rear surface figure error $h_1(x_i,y_j)$ to perhaps 1-λ (HeNe), the front surface figure error $h_2(x_i,y_j)$ generally would have to be corrected to higher accuracy, typically to λ/10 (HeNe).

The invention claimed is:

1. A method for producing a convex mirror having a desired surface figure quality wherein the substrate of the mirror under test, the test optic, is treated as a lens prior to applying a reflective coating to the convex surface of the test optic substrate, the method comprising the steps of:
   a) choosing a material for the test optic substrate that is transmissive at a chosen coherent test beam wavelength, the test optic having a front convex surface side $S_2$ and a rear concave spherical surface side $S_1$, thereby transforming the test optic into a lens;
   b) specifying an (x,y) coordinate system in the pupil plane of the test optic where $(x_i,y_j)$ refers to a set of point locations in the pupil plane, and where i and j are integers ranging from i=1 ... N and j=1 ... M and N and M are large numbers typically between 100 and 1000;
   c) performing an interferometric test #1 to obtain the optical path difference data set $OPD_1(x_i,y_j)$ for the rear concave surface $S_1$ in which the test beam passes through a reference sphere, is reflected off the rear concave surface $S_1$, passes back through the reference sphere and into an interferometer;
   d) performing an interferometric null test #2 to obtain the optical path difference data set $OPD_2(x_i,y_j)$ for the front convex surface $S_2$ in which the test beam transmits first through a null lens, then through the rear concave surface $S_1$ and then reflects off the front convex surface $S_2$, and passes back through the null lens into an interferometer;
   e) performing an interferometric null test #3 to obtain the optical path difference data set $OPD_3(x_i,y_j)$ introduced by inhomogeneity in the test optic substrate in which the test beam transmits first through a null lens, then through the front convex surface $S_2$ and reflects off the rear concave surface $S_1$, and passes back through the null lens into an interferometer
   f) calculating the rear surface $S_1$ surface figure error, $h_1(x_i,y_j)$, the front surface $S_2$ surface figure error, $h_2(x_i,y_j)$, and the optical path difference introduced by inhomogeneity in the test optic substrate, $OPDI(x_i,y_j)$, from the three optical path difference data sets, $OPD_1(x_i,y_j)$, $OPD_2(x_i,y_j)$, and $OPD_3(x_i,y_j)$, respectively;
   g) polishing the front convex surface $S_2$ and the rear concave surface $S_1$ of the test optic to reduce the surface figure errors obtained in f);
   h) iteratively testing and polishing the front convex surface $S_2$ and the rear concave surface $S_1$ of the test optic until a desired front convex surface figure is obtained; and
   i) coating the convex surface with a reflective material once the desired convex surface is obtained to thereby produce the desired convex mirror.

2. The method for producing a convex mirror having a desired surface figure quality of claim 1, wherein step e) is skipped for the case where $OPDI(x_i,y_j)=0$.

3. A method for producing a convex mirror having a desired surface figure quality wherein the substrate of the mirror under test, the test optic, is treated as a lens prior to applying a reflective coating to the convex surface of the test optic substrate, the method comprising the steps of:
   a) choosing a material for the test optic substrate that is transmissive at a chosen coherent test beam wavelength, the test optic having a front convex surface side $S_2$ and a rear concave spherical surface side $S_1$, thereby transforming the test optic into a lens;
   b) specifying an (x,y) coordinate system in the pupil plane of the test optic where $(x_i,y_j)$ refers to a set of point locations in the pupil plane, and where i and j are integers ranging from i=1 ... N and j=1 ... M and N and M are large numbers typically between 100 and 1000;
   c) performing an interferometric test #1 to obtain the optical path difference data set $OPD_1(x_i,y_j)$ for the rear concave surface $S_1$ in which the test beam passes through a reference sphere, is reflected off the rear concave surface $S_1$, passes back through the reference sphere and into an interferometer;
   d) performing an interferometric null test #2 to obtain the optical path difference data set $OPD_2(x_i,y_j)$ for the front convex surface $S_2$ in which the test beam transmits first through a null lens, then through the rear concave surface $S_1$ and then reflects off the front convex surface $S_2$, and passes back through the null lens and into an interferometer;
   e) performing an interferometric null test #4 to obtain the optical path difference data set $OPD_4(x_i,y_j)$ introduced by inhomogeneity in the test optic substrate in which the test beam transmits first through a null lens, then through the front convex surface $S_2$, through the test optic substrate, through the rear surface S1, where it is then reflected back through the test optic by a spherical return mirror, back through the null lens, and into an interferometer;
   f) calculating the rear surface $S_1$ surface figure error, $h_1(x_i,y_j)$, the front surface $S_2$ surface figure error, $h_2(x_i,y_j)$, and the optical path difference introduced by inhomogeneity in the test optic substrate, $OPDI(x_i,y_j)$, from the three optical path difference data sets, $OPD_1(x_i,y_j)$, $OPD_2(x_i,y_j)$, and $OPD_4(x_i,y_j)$, respectively;
   g) polishing the front convex surface $S_2$ and the rear concave surface $S_1$ of the test optic to reduce the surface figure errors obtained in f);
   h) iteratively testing and polishing the front convex surface $S_2$ and the rear concave surface $S_1$ of the test optic until a desired front convex surface figure is obtained; and
   i) coating the convex surface with a reflective material once the desired convex surface is obtained to thereby produce the desired convex mirror.

4. The method for producing a convex mirror having a desired surface figure quality of claim 3, wherein step e) is skipped for the case where $OPDI(x_i,y_j)=0$.

* * * * *